United States Patent Office 3,235,572
Patented Feb. 15, 1966

3,235,572
3-OXYGENATED 17α-TRIFLUOROVINYL-17β-HYDROXY STEROIDS AND INTERMEDIATES
Leonard N. Nysted, Highland Park, Ill., assignor to G. D. Searle & Co., Chicago, Ill., a corporation of Delaware
No Drawing. Filed Mar. 12, 1962, Ser. No. 179,185
8 Claims. (Cl. 260—397.4)

This invention relates to 3-oxygenated 17α-trifluorovinyl-17β-hydroxy steroids, intermediates thereto, and processes whereby these steroids and corresponding intermediates can be prepared. More particularly, this invention relates to steroids of the formula

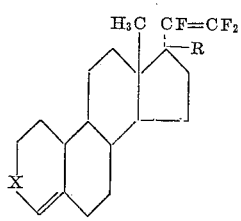

and congeneric steroids of the formula

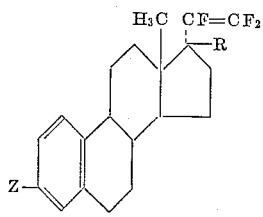

wherein R represents a hydroxy or alkanoyloxy radical; X represents a carbonyl, hydroxy, or alkanoyloxy radical; and Z represents a hydroxy or alkoxy radical.

Among the hydroxy and alkanoyloxy radicals represented by R and X, those in beta configuration are preferred. Moreover, the alkanoyl constituents are most desirably of lower order, i.e., have the formula —CO-lower alkyl Likewise the alkoxy radicals represented by Z are optimally of lower order, having the formula —O-lower alkyl By "lower alkyl" is meant methyl, ethyl, propyl, isopropyl, butyl, isobutyl, sec-butyl, tert-butyl, pentyl, neopentyl, hexyl, isohexyl, heptyl, and isomeric, monovalent, acyclic, saturated, straight- or branched-chain, hydrocarbon groupings of emperical formula —$C_nH_{2n+1}$ wherein $n$ represents a positive integer less than 8.

The compounds to which this invention relates are useful because of their valuable pharmacological properties. Thus, for example, they reduce the concentration of cholesterol in the plasma relative to phospholipid concentration therein; and, further, they are progestational.

Preparation of the solely Δ⁴ products hereof proceeds by interaction of an enol ether of the formula

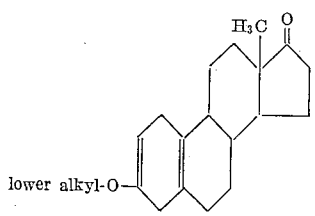

with bromotrifluoroethylene and activated magnesium in an inert ethereal solvent medium to give the corresponding 17α-trifluorovinyl-17β-hydroxy compound

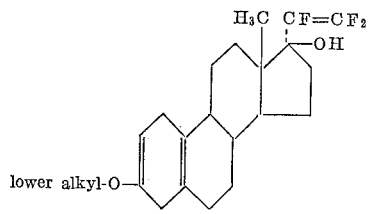

which, on brief heating with aqueous methanolic oxalic acid and sodium bicarbonate, undergoes cleavage of the ether linkage and isomerization to 17α-trifluorovinyl-17β-hydroxyestr-5(10)-en-3-one wherein, on standing dissolved in acetonic mineral acid, the double bond shifts to the Δ⁴⁽⁵⁾ position. The identical product is obtained directly from a 17α-trifluorovinyl-3-(lower alkoxy)estra-2,5(10)-dien-17β-ol if the described treatment with acetonic mineral acid is substituted for that with aqueous methanolic oxalic acid and sodium bicarbonate. Reduction of 17α-trifluorovinyl-17β-hydroxyestr-4-en-3-one with lithium tri-tert-butoxyaluminum hydride in an inert ethereal solvent medium affords the corresponding 3,17-diol which, in turn, is esterified by heating with pyridine and an alkanoic acid anhydride.

The Δ¹,³,⁵⁽¹⁰⁾ products hereof eventuate by interaction of a corresponding 17-one of the formula

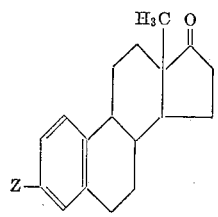

with bromotrifluoroethylene and activated magnesium in an inert ethereal solvent medium, the resultant alcohol

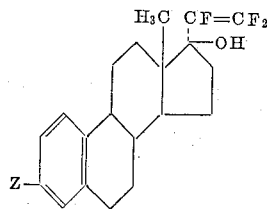

being subject to esterification of the hydroxyl(s) present by heating with pyridine and an alkanoic acid anhydride or chloride. (Z in the latter two formulas retains the meaning previously assigned.)

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. *17α - trifluorovinyl - 3 - methoxyestra-2,5(10)-dien-17β-ol.*—A mixture of 52 parts of magnesium, approximately 1 part of iodine, and 350 parts of tetrahydrofuran is freed of solvent by distillation, whereupon the residue is baked at about 150° for 30 minutes. It is then cooled to 70°, at which point a cold solution of 400 parts of bromotrifluoroethylene in 700 parts of tetrahydrofuran is introduced. The resultant mixture is allowed to warm under reflux to a vigorous boil and held there until the magnesium is consumed. Excess bromotrifluoroethylene is then removed by distillation, whereupon a slurry of 300 parts of 3 - methoxyestra-2,5(10)-dien-17-one in 1400 parts of tetrahydrofuran is rapidly added at approximately 5°. The reactants are thereupon allowed to warm to to room temperature and maintained thereat with agitation for 3 hours. Approximately 2200 parts of aqueous 10% Rochelle salt, followed by 2000 parts of water, are next introduced. Tetrahydrofuran is then removed by vacuum distillation, and the brown oil which separates is extracted with ether. The ether solution is washed with water, dried over anhydrous sodium sulfate, and stripped of solvent by vacuum distillation. The residue is dissolved in 2100 parts of ether. To the ether solution is added 150 parts of aluminum silicate. The resultant mixture is maintained with agitation at room temperature for 15 minutes, then filtered through diatomaceous earth. The filtrate is concentrated to approximate ⅓ volume by distillation under nitrogen, and the concentrate thus obtained is diluted with 3 volumes of a solution of 1 part of pyridine in 1500 parts of methanol. The crystalline solid which precipitates on standing is filtered off, washed with cold methanol, and dried in air. The material thus isolated is 17α-trifluorovinyl-3-methoxyestra-2,5(10) - dien-17β-ol, melting at 155–157°.

B. *17α-trifluorovinyl - 17β - hydroxyestr - 5(10) - en-3 one.*—To a solution of 50 parts of 17α-trifluorovinyl-3-methoxyestra-2,5(10)-dien-17β-ol in 800 parts of methanol at the boiling point under reflux is added a solution of 3 parts of oxalic acid in 300 parts of water. The resultant mixtures is heated at the boiling point under reflux for 6 minutes, then diluted with a solution of 4 parts of sodium bicarbonate in 250 parts of water followed by 5000 parts of water. The solid which precipitates is filtered off, dried in air, and recrystallized from a mixture of ether and hexane to give 17α-trifluorovinyl-17β-hydroxyestr-5(10)-en-3-one melting at 118–120°.

C. *17α-trifluorovinyl-17β-hydroxyestr - 4 - en-3-one.*— A solution of 10 parts of 17α-trifluorovinyl-17β-hydroxyestr-5(10)-en-3-one in a mixture of 130 parts of acetone, 40 parts of water, and 5 parts of concentrated hydrochloric acid is allowed to stand at room temperatures for 5 hours, then diluted with an equal volume of water. The solid which precipitates is filtered off, dried in air, and recrystallized from a mixture of acetone and hexane to give 17α-trifluorovinyl-17β-hydroxyestr-4 - en - 3 - one melting at 188–190°, and having the formula

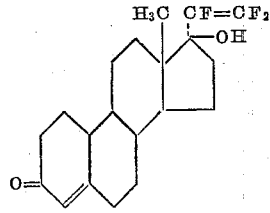

The identical product is obtained when 17α-trifluorovinyl-3-methoxyestra-2,5(10)-dien-17β-ol is substituted for 17α-trifluorovinyl-17β-hydroxyestr-5(10)-en-3-one in the foregoing procedure.

EXAMPLE 2

*17α-trifluorovinylestr-4-ene-3β,17β-diol.*—To a solution of 16 parts of lithium tri-tert-butoxy-aluminum hydride in 280 parts of tetrahydrofuran is slowly added, with agitation, a solution of 9 parts of 17α-trifluorovinyl-17β-hydroxyestr-4-en-3-one in 140 parts of tetrahydrofuran. The resultant mixture is maintained with agitation for 2 hours at room temperatures, whereupon 200 parts of aqueous 10% acetic acid is introduced. Tetrahydrofuran is removed by vacuum distillation at around 30°, and the oil which separates is extracted with ether. The ether extract is washed with water and dilute aqueous sodium bicarbonate, dried over anhydrous sodium sulfate, and stripped of solvent by vacuum distillation. The residue, crystallized from a mixture of ether and hexane, affords 17α-trifluorovinylestr-4-ene-3β,17β-diol melting with decomposition above 110°. The product has the formula

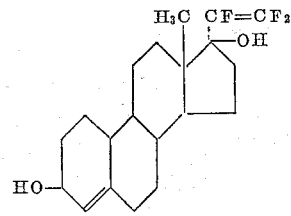

EXAMPLE 3

*3β,17β-diacetoxy-17α-trifluorovinylestr-4-en.*—A solution of 4 parts of 17α-trifluorovinylestr-4-ene-3β,17β-diol in 32 parts of pyridine and 32 parts of acetic anhydride is heated at the boiling point under reflux for 5 hours. It is then cooled and poured with vigorous agitation over 250 parts of ice. The oil which separates is extracted with ether; and the ether extract is washed with water and dilute aqueous sodium bicarbonate, then dried over anhydrous sodium sulfate, and finally stripped of solvent by vacuum distillation. The residual oil is 3β,17β-diacetoxy-17α-trifluorovinyl-estr-4-en, having the formula

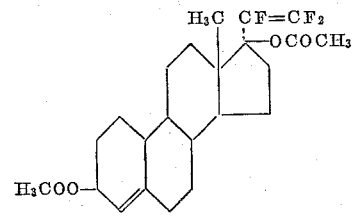

EXAMPLE 4

*17α-trifluorovinyl - 3 - methoxyestra - 1,3,5(10)-trien-17β-ol.*—Substitution of 300 parts of 3-methoxyestra-1,3,5(10)-trien-17-one for the 3-methoxyestra-2,5(10)-dien-17-one called for in Example 1A affords, by the procedure there detailed, 17α-trifluorovinyl-3-methoxyestra-1,3,5(10)-trien-17β-ol melting at approximately 112–113° and having the formula

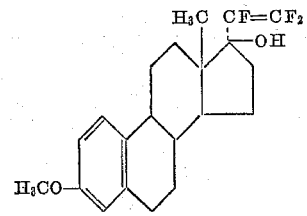

EXAMPLE 5

*17α - trifluorovinylestra - 1,3,5(10)-triene-3,17β-diol.*— A mixture of 69 parts of magnesium, approximately 1 part of iodine, and 475 parts of tetrahydrofuran is freed of solvent by distillation, whereupon the residue is baked at about 150° for 30 minutes. It is then cooled to −70°, at which point a cold solution of 500 parts of bromotrifluoroethylene in 875 parts of tetrahydrofuran is introduced. The resultant mixture is allowed to warm under reflux to a vigorous boil and held there until the magnesium is consumed. Excess bromotrifluoroethylene is then removed by distillation, whereupon a slurry of 265 parts of estrone in 2800 parts of tetrahydrofuran is rapidly added at approximately 5°. The reactants are thereupon allowed to warm to room temperatures and maintained thereat with agitation overnight. A solution of 500 parts of water is next introduced, following with tetrahydrofuran is removed by vacuum distillation. The brown oil which separates is extracted into ethyl acetate. The ethyl acetate extract is consecutively washed with water and dilute aqueous potassium bicarbonate, dried over anhydrous sodium sulfate, and stripped of solvent by vacuum distillation. The residue is 17α-trifluorovinylestra-1,3,5(10)-triene-3,17β-diol, having the formula

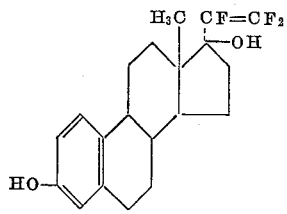

EXAMPLE 6

*3,17β - diacetoxy - 17α - trifluorovinylestra - 1,3,5(10)-trien.*—Substitution of 4 parts of 17α-trifluorovinylestra-1,3,5(10)-triene-3,17β-diol for the 17α-trifluorovinylestra-4-ene-3β,17β-diol called for in Example 3 affords, by the procedure there detailed, 3,17β-diacetoxy-17α-trifluorovinylestra-1,3,5(10)-trien, having the formula

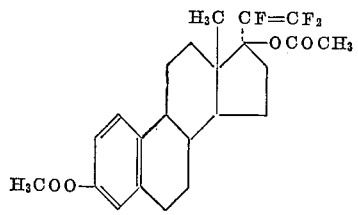

What is claimed is:

1. A compound selected from the group consisting of compounds of the formula

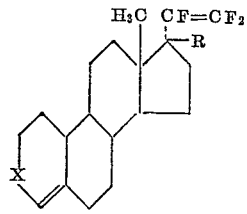

and compounds of the formula

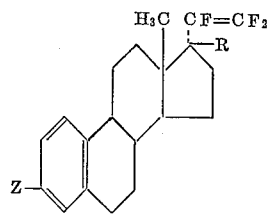

wherein X represents a member of the group consisting of the carbonyl radical and the radical R in beta configuration, R represents a member of the group consisting of hydroxy and (lower alkanoyl)oxy radicals, and Z represents a member of the group consisting of lower alkoxy radicals and the radical R.

2. 17α-trifluorovinyl-17β-hydroxyestra-4-en-3-one.
3. 17α-trifluorovinylestra-4-ene-3β,17β-diol.
4. 3β,17β-diacetoxy-17α-trifluorovinylestra-4-en.
5. 17α - trifluorovinyl-3-methoxyestra - 1,3,5(10)-trien-17β-ol.
6. 17α-trifluorovinylestra-1,3,5(10)-triene-3,17β-diol.
7. A compound of the formula

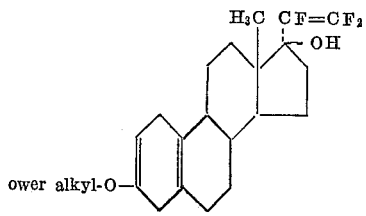

8. 17α - trifluorovinyl - 3 - methoxyestra-2,5(10)-dien-17β-ol.

No references cited.

LEWIS GOTTS, *Primary Examiner.*